United States Patent [19]

Lindsey

[11] Patent Number: 5,069,507
[45] Date of Patent: Dec. 3, 1991

[54] DUMPING TRAILER

[76] Inventor: Vurness T. Lindsey, 6327 Egret Ct., Ventura, Calif. 93003

[21] Appl. No.: 600,684

[22] Filed: Oct. 22, 1990

[51] Int. Cl.$^5$ ............................. B60P 1/02; B60P 1/34
[52] U.S. Cl. ........................................ 298/11; 298/14; 414/471; 414/477; 414/482
[58] Field of Search ................... 105/268; 298/11, 12, 298/14; 414/477, 471, 482

[56] References Cited

U.S. PATENT DOCUMENTS

| | | | |
|---|---|---|---|
| 920,512 | 5/1909 | Wright | 298/11 |
| 3,363,596 | 1/1968 | Grinwald | 298/11 X |
| 4,348,054 | 9/1982 | Shonkwiler et al. | 298/14 X |

FOREIGN PATENT DOCUMENTS 2104487  3/1983  United Kingdom ................. 298/11

Primary Examiner—Robert J. Spar
Assistant Examiner—Janice Krizek
Attorney, Agent, or Firm—Jack C. Munro

[57] ABSTRACT

A dumping trailer wherein the cargo carrying surface of the trailer is movably mounted relative to the bed frame of the trailer. A cargo carrying surface is to be movable from the bed frame to an initially raised position while still being maintained substantially parallel to the bed frame. From this initially raised position, the cargo carrying surface is to be inclined to facilitate dumping of any cargo from the rear end of the trailer. When the cargo carrying surface is in the raised position, a locking mechanism is activated which holds the rear portion of the cargo carrying surface in this raised position as the cargo carrying surface is inclined.

4 Claims, 4 Drawing Sheets

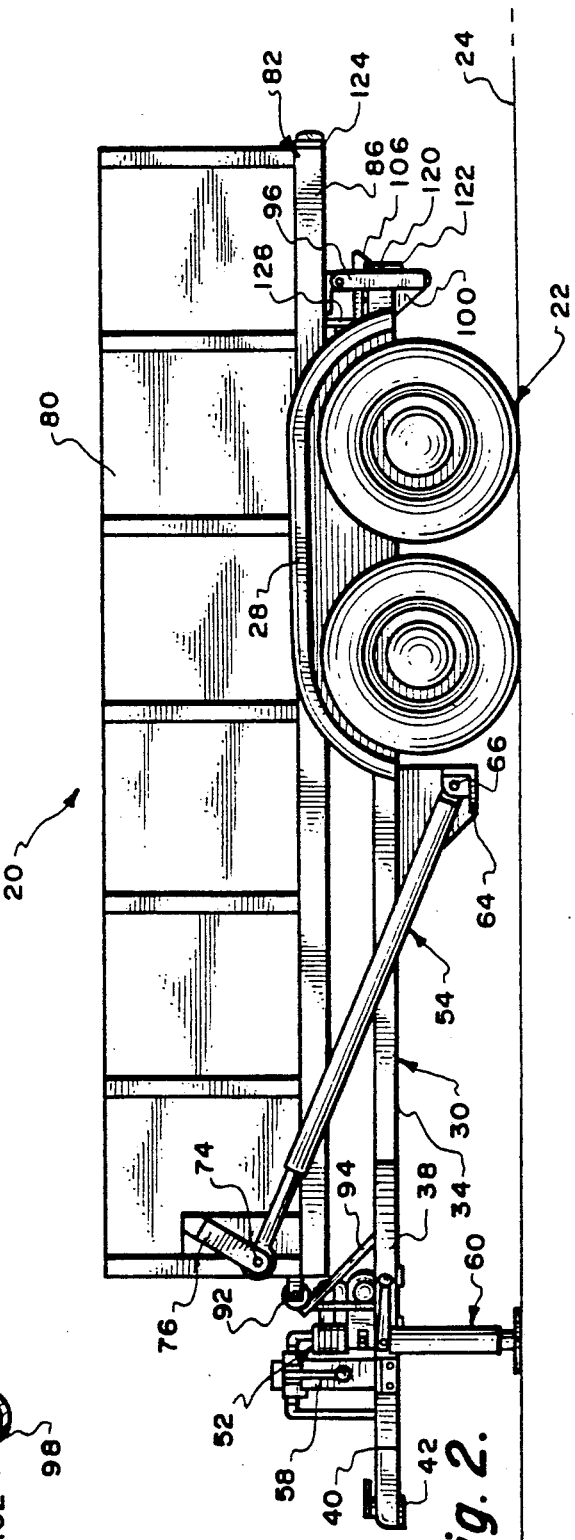
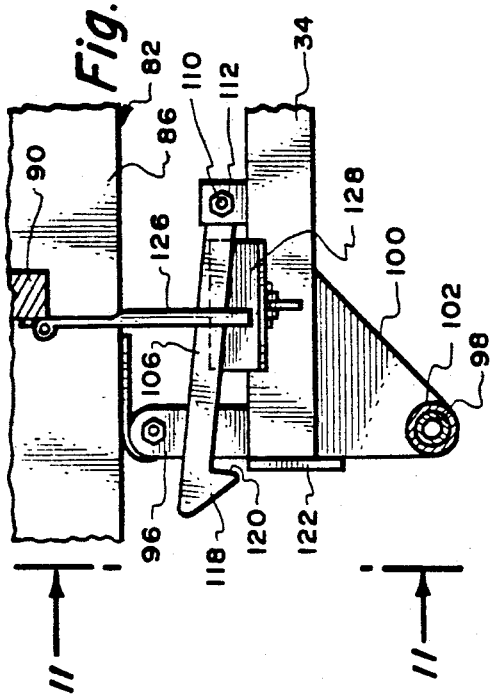
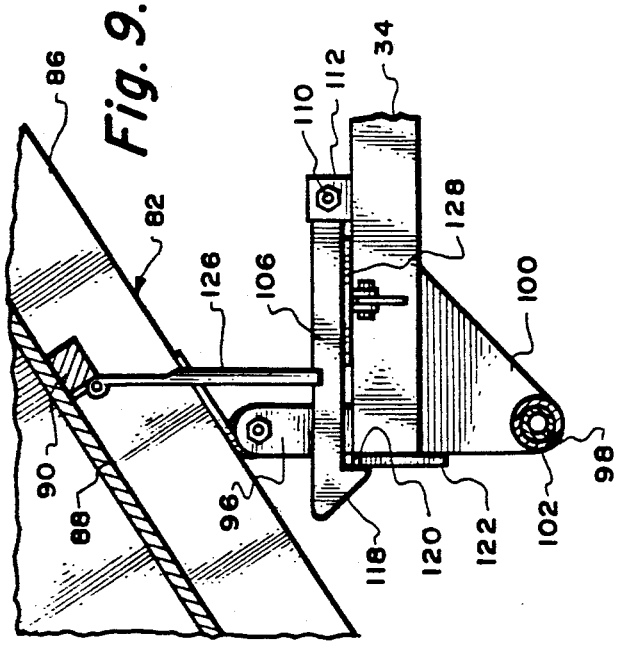

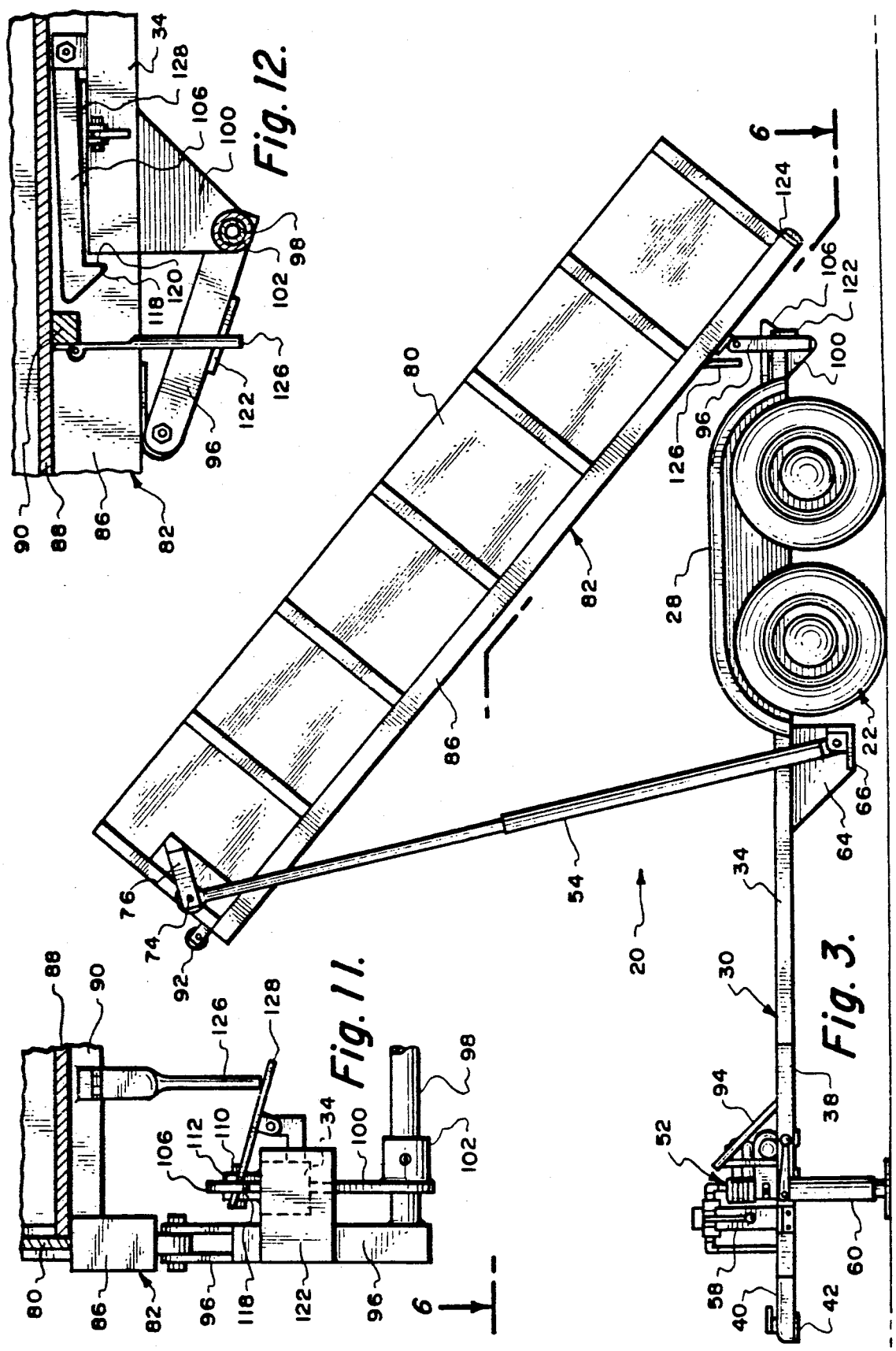

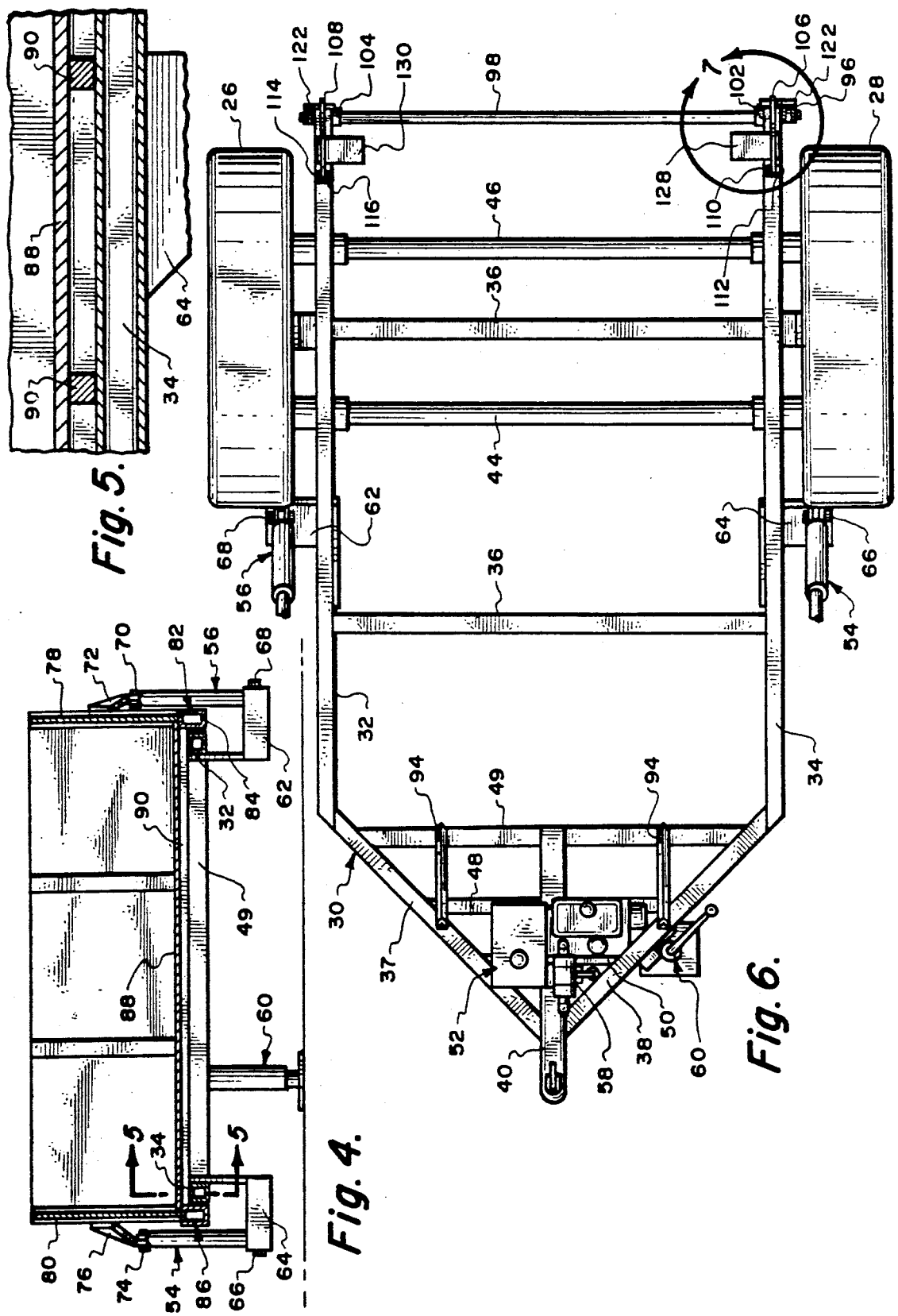

DUMPING TRAILER

BACKGROUND OF THE INVENTION

The field of this invention relates to trailers and more particularly to a trailer which has a cargo carrying surface which is movable to a tilting position to facilitate dumping of cargo exteriorly of the rear end of the trailer.

The use of trailers to be towed by a vehicle such as an automobile or truck has long been known. Trailers are in common use to carry cargo. Many times this cargo comprises dirt, sand and even trash. When hauling cargo such as dirt, sand and trash, this cargo is normally thrown onto the cargo carrying surface of the trailer. Once the desired amount of such cargo has been placed in the trailer, the trailer is then moved to a location and the cargo is then to be dumped. The dumping of such cargo is generally not accomplished easily since it is necessary for one or more human beings to physically remove the cargo. Removing of the cargo frequently requires just as much effort, if not more, as loading of the cargo into the trailer.

It has long been known that a quick way to discharge the contents of a loaded vehicle is to move the cargo supporting surface to an inclined position causing the cargo to merely slide off the cargo supporting surface. Trucks have long been manufactured to include such a movable cargo supporting surface and such trucks are commonly referred to as a dump truck. In the past, there have been attempts at constructing of trailers to also include such a movable cargo supporting surface. However, such dumping trailers have been of a complex construction which has resulted in a high manufacturing cost which substantially prohibits widespread usage of such trailers.

SUMMARY OF THE INVENTION

The structure of the present invention relates to a dumping trailer which is constructed to operate simply and is composed of relatively few parts and therefore can be manufactured at a relatively inexpensive price and sold to the ultimate consumer at a similarly inexpensive price.

Another objective of the present invention is to construct a dumping trailer which can be effectively purchased by rental yards to be then rented to consumers that intend to use the trailer to dump cargo such as dirt and trash.

Another objective of the present invention is to construct a trailer that is located close to the supporting surface to facilitate loading but yet can be raised to dump the loaded trailer.

The dumping trailer of the present invention uses a bed frame which is mounted on a wheel assembly with the wheel assembly to be movable on a typical supporting surface such as a roadway. The bed frame is to be connected to an automotive or truck type of vehicle which is to tow the trailer. Mounted on the bed frame is a box frame with the box frame to include the cargo supporting surface. The box frame is to be movable relative to the bed frame. The lower position of the box frame is when the box frame is substantially in horizontal alignment with the bed frame. An actuator assembly is connected between the box frame and the bed frame and when initially activated causes the box frame to move from the lower position to a raised position which positions the box frame a slight distance above the bed frame with the box frame still being located in a parallel relationship relative to the bed frame. Positioned directly adjacent the rear end of the box frame is a pivoting linkage assembly which is locked by a locking mechanism when in the raised position. The fore end of the box frame is then moved by an acuator to an inclined position generally between thirty and forty-five degrees relative to the bed frame. The locking mechanism is to insure that the pivoting linkage assembly is securely held in its established position during this inclination of the box frame. When the box frame is moved from the inclined position back to the raised position, a disengaging pawl connects with the locking mechanism causing such to be disengaged so that the box frame can then be moved from the raised position to the lower position.

BRIEF DESCRIPTION OF THE DRAWINGS

FIG. 2 is a side elevational view of the dumping trailer of the present invention showing the dumping trailer in the raised position;

FIG. 3 is a side elevational view of the dumping trailer of the present invention showing the dumping trailer in the inclined position;

FIG. 4 is a transverse cross-sectional view through the body of the dumping trailer of the present invention taken along line 4—4 of FIG. 1;

FIG. 5 is a longitudinal cross-sectional view through a portion of the body of the dumping trailer of the present invention taken along line 5—5 of FIG. 4;

FIG. 6 is a top view of the bed frame of the dumping trailer of the present invention taken along line 6—6 of FIG. 3;

FIG. 9 is a side view of the locking mechanism taken along line 9—9 of FIG. 8 with the box frame in the inclined position relative to the bed frame;

FIG. 10 is a view similar to FIG. 9 of the locking mechanism showing the box frame in the raised position as the box frame is being lowered which shows a disengaging pawl connecting with the locking mechanism to move such to the unlatched position;

FIG. 11 is an end view of the locking mechanism taken along line 11—11 of FIG. 10; and FIG. 12 is a view similar to FIG. 10 showing the locking mechanism in the position when the box frame is in the lower position.

DETAILED DESCRIPTION OF THE SHOWN EMBODIMENT

Figure 8:
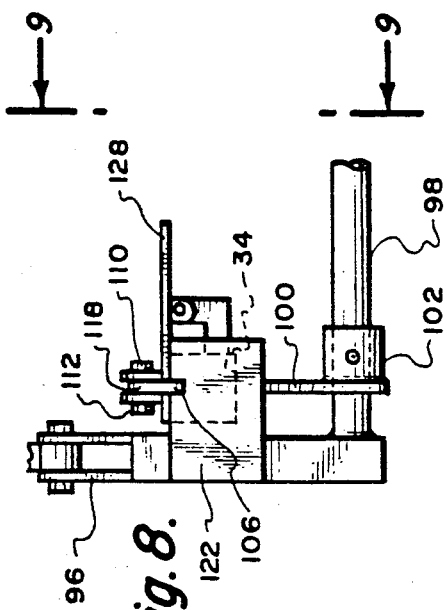
FIG. 8 is a rear view of the locking mechanism of the present invention taken along line 8—8 of FIG. 7.
Figure 7:
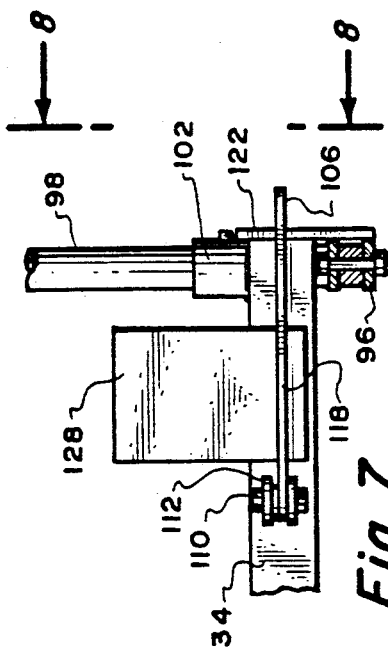
FIG. 7 is an enlarged view of the locking mechanism associated with the bed frame taken along line 7—7 of FIG. 6.

Referring particularly to the drawings, there is shown the dumping trailer 20 of this invention. Dumping trailer 20 has a wheel assembly 22 which is designed to roll on a supportive surface 24. A typical supporting surface 24 would be a roadway. The wheel assembly 22 includes a first pair of aligned tires which are located under a fender 26 and a second pair of aligned tires which are located under a fender 28. Fenders 26 and 28 are fixedly mounted onto a bed frame 30. The bed frame 30 is defined generally by a pair of parallel, spaced apart, longitudinally arranged side beams 32 and 34 which are integrally connected together by a plurality of cross beams 36. The fore end of the beams 32 and 34 are connected together respectively by slanting beams 37 and 38. The outer end of the beams 37 and 38 are joined together by a tongue 40. The outer end of the tongue 40 terminates in a socket 42. Socket 42 is to connect to a ball (not shown) mounted on the frame of the vehicle (not shown) that is to do the towing of the dumping trailer 20. The tires of the wheel assembly 22 are connected together by parallel, spaced apart axles 44 and 46.

Mounted between the slanting beams 37 and 38 are a plurality of cross braces 48, 49 and 50. Mounted on the cross braces 48 and 50 is a gasoline operated motor 52. Motor 52 is basically similar to what is used in conjunction with a conventional lawn mower.

Motor 52 connects through hydraulic lines (not shown) to actuators 54 and 56. The hydraulic fluid is supplied to and discharged from the actuators 54 and 56 by manual control of control valve 58. The tongue 40 is supported in a spaced relationship from the supportive surface 24 by means of a hand operated jack assembly 60. The jack assembly 60 is to be used in a conventional manner to install the socket 42 in conjunction with the ball (not shown) mounted on the towing vehicle (not shown). Also, the jack 60 is to be utilized to disengage the socket 42 from the ball.

Mounted on the longitudinal rail 32 is a mounting plate 62. Also mounted on the longitudinal rail 34 is a mounting plate 64. The mounting plates 62 and 64 are in transverse alignment. The bottom end of the actuator 54 is pivotally mounted by means of bolt 65 to the mounting plate 64. In a similar manner, the bottom end of the actuator 56 is pivotally mounted by means of bolt 68 to the mounting plate 62.

The upper end of the actuator 56 is pivotally mounted by a bolt 70 to an attaching plate 72. In a similar manner, the upper end of the actuator 54 is pivotally mounted by means of bolt 74 to an attaching plate 76. Attaching plate 72 is fixedly mounted onto side wall 78. Attaching plate 76 is fixedly mounted to side wall 80. Side walls 78 and 80 are fixedly attached to a box frame 82. The box frame 82 is formed of side rails 84 and 86 which are located in a parallel, spaced apart relationship. Side rails 84 and 86 are connected together at their ends by cross members (not shown). Mounted on the top surface of these cross members, as well as the side rails 84 and 86, is a floor 88. Floor 88 is of sheet material and will normally be of metal. Floor 88 is also mounted on the upper surface of cross braces 90 which extend between the rails 84 and 86. There will be utilized a plurality of cross braces 90.

Figure 1:
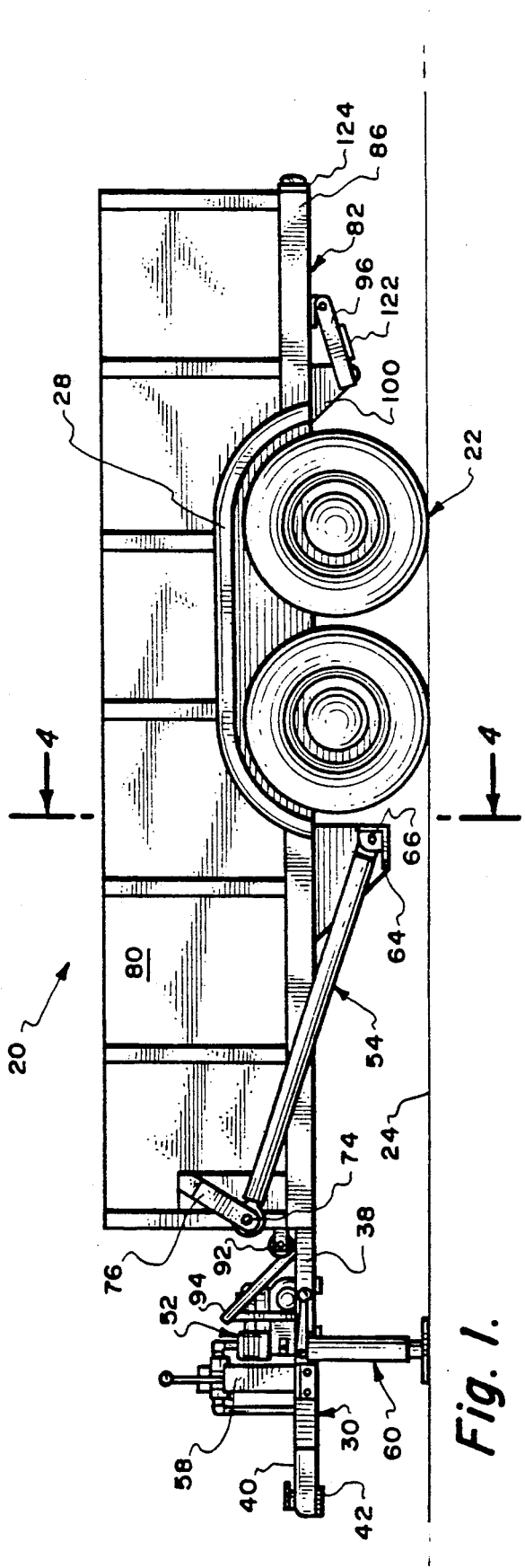
FIG. 1 is a side elevational view of the dumping trailer of the present invention showing the dumping trailer in the lower position.

The box frame 82 is to be movable from the lower position shown in FIG. 1 to the raised position shown in FIG. 2 and then to the inclined position shown in FIG. 3. When the box frame 82 is in the lower position shown in FIG. 1, the rail 84 is in juxtaposition to side beam 32 but just slightly spaced exteriorly therefrom. Also, the rail 86 is in juxtaposition to the side beam 34 and again is slightly spaced exteriorly of side beam 34.

Initial operation of the actuators 54 and 56 causes the box frame 82 to be raised from the bed frame 30 and maintain a substantially parallel relationship thereto. This raising is accomplished at the fore end of the box frame 82 by a pair of rollers 92 riding on inclined ramps 94. There are two in number of the ramps 94 fixedly mounted onto the cross beam 49 and slanting beams 37 and 38 of the bed frame 30. A separate roller 92 is to connect with each ramp 94 of there will be two in number of the rollers 92 fixedly mounted onto the box frame 82.

The rear end of the box frame 82 is raised by a pivot linkage assembly which comprises a pair of spaced apart pivot links 96. One link 96 is pivotally mounted onto rail 86 with the other link 96 being pivotally mounted onto the rail 84. The lower end of both the links 96 are integrally secured to a pivot rod 98. The pivot rod 98 is conducted through mounting plates 100 with one mounting plate 100 being fixedly mounted onto beam 34 and the other mounting plate 100 being fixedly mounted onto beam 32. A sleeve 102 is mounted on the pivot rod 98 and is designed to butt up against the mounting plate 100 to provide lateral support for the mounting plate 100. A similar sleeve 104 is located against the remaining plate 100.

It can thusly be seen that when the actuators 54 and 56 are activated causing the rollers 92 to move up their respective ramps 94 that the pivot links 96 will pivot from an almost horizontal position to a vertical position which causes the rear portion of the box frame 86 to be elevated to the raised position spaced a short distance from the bed frame 30.

When the box frame 86 is in the raised position, it is desirable to make sure that the links 96 are maintained in this vertical position during the time the box frame 82 moves to the inclined position shown in FIG. 3. In order to insure that this occurs, a locking mechanism is utilized.

The locking mechanism includes a pair of hook members 106 and 108. Hook member 106 is pivotally mounted by bolt 110 onto a bracket 112 which is fixedly mounted on beam 34. The hook member 108 is similarly pivotally mounted by means of a bolt 114 on a bracket 116 that is fixedly mounted onto beam 32. Each of the hook members 106 and 108 has an enlarged head forming an exterior camming surface 118 and an inward catching shoulder 120. Mounted on each of the pivot links 96 is a cam plate 122. When the pivot links 96 are moved from a horizontal to the vertical position, a cam plate 122 comes into contact with a camming surface 118 which causes its respective hook member 106 and 108 to be pivoted upward slightly until the plate 122 connects with the catching shoulder 120. At this time the hook members 106 fall by gravity in a downward direction with the result that the links 96 are maintained in this established vertical position which also means that the rear end of the box frame 82 is maintained in the raised position from the supporting surface 24. This raised position is desired so that, when the actuators 54 and 56 cause the box frame 82 to be moved to the inclined position as shown in FIG. 3, that the bottom rear edge 124 does not come into contact with the supportive surface 24 but will remain spaced some distance therefrom. This spacing of the bottom rear edge 124 is to facilitate dumping of the cargo which has been placed on the floor 88.

During the time that the box frame 82 is moved to the inclined position, a disengaging pawl 126 is pivoted to a substantially vertical position as is shown within FIGS. 9 and 10 of the drawings. The disengaging pawl 126 is pivotally mounted onto a cross brace 90. It is to be understood that there is a separate disengaging pawl 126 for each hook member 106 and 108.

Pivotally mounted on the beam 34 is a plate 128. A similar plate 130 is pivotally mounted onto the beam 32.

The inner portion of the plate 128 rests under the hook member 106. In a similar manner, the inner portion of the plate 130 rests under the hook member 108. When the disengaging pawls 126 have assumed a vertical position when the box frame 82 is in the inclined position and the cargo has been dumped, manual operation of the valve 58 will cause fluid to be expelled from the actuators 54 and 56 which results in the box frame 82 to begin to move downward toward a horizontal position which is shown in FIG. 2. As the movement of the box frame 82 occurs, the disengaging pawls 126 come into contact with the outer end of the plates 128 and 130. This causes the hook members 106 and 108 to be pivoted to the position shown in FIG. 10 disengaging their respective catching shoulders 120 from the plates 122. This will now permit the box frame 86 to be moved from the raised position shown in FIG. 2 to the lower position shown in FIG. 1. The rollers 92 are free to move down their respective ramps 94 and at the same time the pivot links 96 will be pivoted from the vertical position to the horizontal position. When in this horizontal position, the disengaging pawls 126 will disengage from the plates 128 and 130 which will then permit the plates 128 and 130 to pivot back to the position shown in FIG. 9 due to the physical weight of their respective hook members 106 and 108 to which they are engaged. At this time, the hook members 106 and 108 are in the position, again ready to be contacted by the plates 122, to lock in position the links 96 when the box frame 82 is moved from the lower position to the raised position.

It is desirable to have the floor 88 located near the supporting surface 24 to facilitate loading of cargo on the floor 88. However, if tilting of the floor 88 occurs from this lower position, the floor 88 could only tilt about thirty degrees. Therefore, the floor 88 is first moved to the raised position shown in FIG. 2 and then tilted which permits the floor 88 to be tilted about forty-five degrees. This amount of tilting greatly facilitates dumping of the cargo from floor 88.

What is claim is:

1. A dumping trailer comprising:
   a wheel assembly resting on a supporting surface facilitating movement of said dumping trailer on said supporting surface;
   a bed frame, said wheel assembly being mounted on said bed frame;
   a box frame mounted on said bed frame, said box frame to include a cargo carrying surface, said box frame having a rear end and a fore end;
   a pivoting linkage connecting said box frame and said bed frame, said pivoting linkage being located adjacent said rear end, said pivoting linkage permitting movement of said box frame between a lower position and a raised position, said lower position being when said box frame is in juxtaposition with said bed frame, said raised position being when said box frame is spaced from said bed frame and located a greater distance from said supporting surface than when said box frame is in said lower position;
   an actuator assembly connected between said box frame and said bed frame, said actuator assembly to be activatable to produce movement of said box frame from said lower position to said raised position;
   a track assembly mounted on said bed frame, a roller assembly mounted on said box frame, said roller assembly to move on said track assembly as said box frame moves from said lower position to said raised position, said track assembly to be located directly adjacent said fore end, said track assembly causes said box frame to remain parallel to said bed frame as said box frame moves between said lower position and said raised position; and
   said box frame to be movable to an inclined position from said raised position, said inclined position being when said box frame is located at an inclined angle relative to said bed frame.

2. The dumping trailer as defined in claim 1 further comprising:
   a locking mechanism mounted on said bed frame, said locking mechanism to connect with and fix in position said pivoting linkage upon said pivoting linkage being moved from said lower position to said raised position.

3. The dumping trailer as defined in claim 2 further comprising:
   a disengaging pawl, said disengaging pawl to connect with said locking mechanism during movement of said box frame from said raised position to said lower position causing movement of said locking mechanism to an unlocked position.

4. The dumping trailer as defined in claim 1 wherein:
   said inclined position being when said fore end of said box frame is moved to a further spaced position from said bed frame than said rear end of said box frame.

* * * * *